United States Patent

Henriksson

[11] Patent Number: 5,871,190
[45] Date of Patent: Feb. 16, 1999

[54] LOAD CARRIER FOOT

[75] Inventor: Jan Henriksson, Taberg, Sweden

[73] Assignee: Industri AB Thule, Hillerstorp, Sweden

[21] Appl. No.: 241,004

[22] Filed: May 11, 1994

[30] Foreign Application Priority Data

Jun. 7, 1993 [SE] Sweden .................................. 9301823

[51] Int. Cl.$^6$ .................................................. B60R 9/00
[52] U.S. Cl. ...................... 248/231.21; 224/331
[58] Field of Search ........................ 248/231.2; 224/331, 224/329

[56] References Cited

U.S. PATENT DOCUMENTS

| 4,461,414 | 7/1984 | Gieber | 224/331 |
| 4,640,450 | 2/1987 | Gallion et al. | |
| 4,723,696 | 2/1988 | Stichweh et al. | |
| 4,725,030 | 2/1988 | Miller | 248/231.2 |
| 4,877,169 | 10/1989 | Grim | 224/331 |
| 4,993,615 | 2/1991 | Arvidsson | 224/329 |
| 5,366,128 | 11/1994 | Grim | 224/529 X |
| 5,366,195 | 11/1994 | Arvidsson | 224/331 X |

FOREIGN PATENT DOCUMENTS

| 0 163 187 | 5/1985 | European Pat. Off. |
| 2 559 110 | 2/1984 | France . |
| 27 40 522 | 3/1979 | Germany . |
| 35 33 749 | 7/1987 | Germany . |
| 42 00 532 | 7/1992 | Germany . |

Primary Examiner—Alvin C. Chin-Shue
Attorney, Agent, or Firm—Royston, Rayzor, Vickery, Novak & Druce, L.L.P.

[57] ABSTRACT

A load carrier foot is intended to secure, on a vehicle roof (9), a load carrier strut, and has a support portion (7) which supports the foot on the vehicle. The load carrier foot is further provided with a clamping portion (12) which, under the action of a clamping mechanism (18, 22, 24), is urgeable against a bead (10) on the vehicle in order thereby to secure the load carrier foot. The clamping portion (12) is provided, in its central region, with a rockable or tiltable anchorage (13) in the body (1) of the load carrier foot so that a clamping member (14) located at its one end is movable into and out of engagement with the bead (10). The opposite end (15) of the clamping portion (12) is actuable by means of the one end (20) of a lever (18) pivotally secured in the body (1) and whose other end (21) is actuable by a cam section (24) on a pivotal operating handle (22).

17 Claims, 2 Drawing Sheets

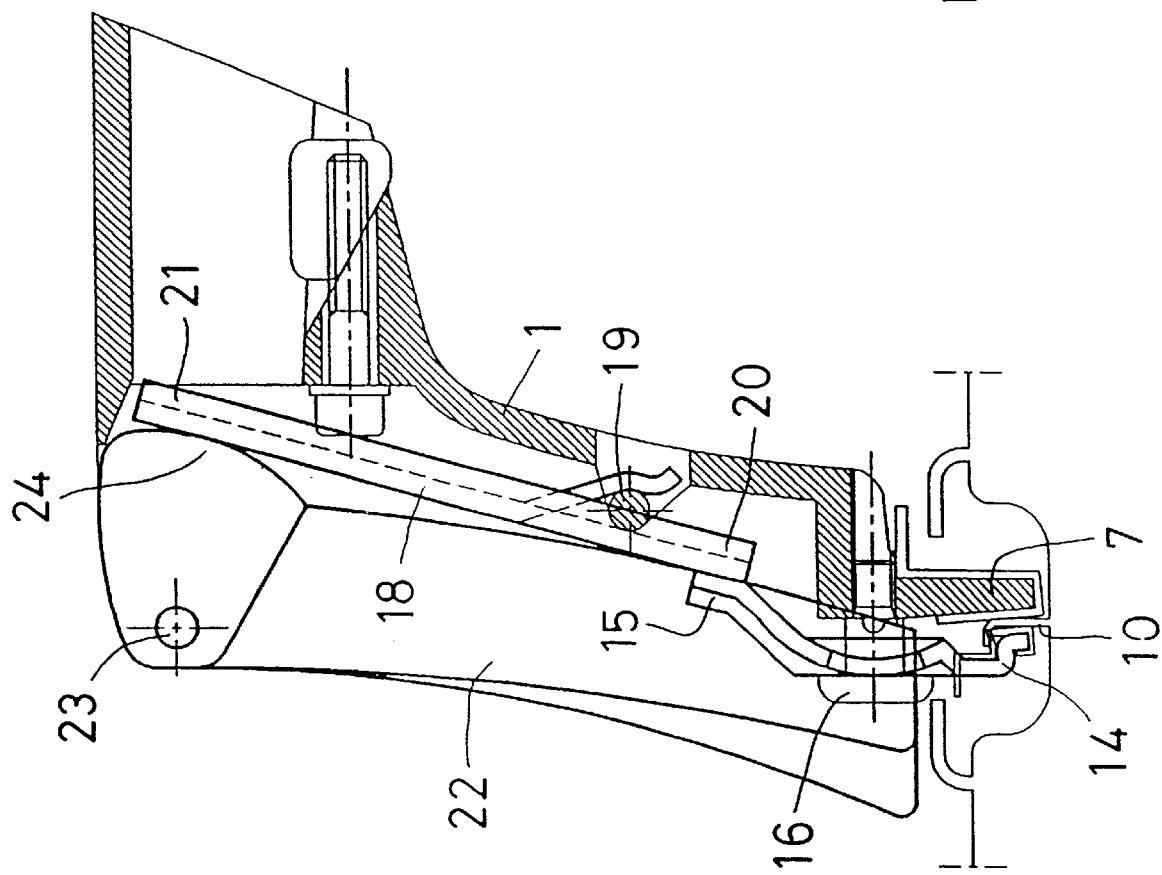

LOAD CARRIER FOOT

TECHNICAL FIELD

The present invention relates to a load carrier foot for the securement, on a vehicle roof, of a load carrier strut extending transversely over the roof, and comprising a support portion for supporting the load carrier foot on the vehicle, and a clamping portion which, under the action of a clamping mechanism, is urgeable against the vehicle or a bead disposed thereon, of the anchorage or gutter drip type, for securing the load carrier foot.

BACKGROUND ART

A multiplicity of variations of load carrier feet of the type mentioned by way of introduction are previously known in the art. These load carrier feet are often intended for mounting on such vehicles as display longitudinally directed, depressed gutters extending along the vehicle roof and provided with an anchorage bead upstanding from the bottom of the gutter. In one version of such a prior art load carrier foot, the support portion is of twin design and is intended to stand one piece in front of the other in the longitudinal direction of the vehicle on one side of the anchorage bead and support against the bottom of the gutter. Correspondingly, the clamping portions are also of twin design and are urgeable against the support portions by means of screws, one per clamping portion.

A load carrier foot of this prior art type may, on many occasions, function satisfactorily, but is difficult to mount in place and dismount from the vehicle roof, since the screws in question are difficult to get at. In one such load carrier foot, it is also difficult to guarantee a suitable clamping force, since every user must individually assess how large the tightening torque employed should be. The risk of loose mounting, or in the case of overtightened screws, the risk of damage to the load carrier foot and/or the vehicle itself cannot be discounted. Furthermore, some type of lockable protective hood is necessary which covers the screws so as to prevent unauthorised removal of the load carrier foot.

PROBLEM STRUCTURE

The present invention has for its object to devise the load carrier foot disclosed by way of introduction such that it, in a very simple and convenient manner, may be mounted on and dismounted from a vehicle. Thus, the present invention has for its object to devise a load carrier foot in which fixed clamping can be effected by means of a simple manual operation without the employment of separate tools. The present invention further has for its object to realise a load carrier foot in which the clamping force against the vehicle or its anchorage bead may be kept within a predetermined range so that the risk of overtightening the load carrier foot or the anchorage bead of the vehicle is eliminated. Finally, the present invention has for its object to realise a load carrier foot which is simple and economical in manufacture and which requires no separate protective hoods or caps to prevent or impede theft.

SOLUTION

The objects forming the basis of the present invention will be attained if the load carrier foot disclosed by way of introduction is characterized in that the clamping portion has, at its one end, a clamping member which is urgeable against the vehicle or the bead disposed thereon, has, at its other end, an actuator portion for transferring the clamping portion to a clamping position under the action of a clamping mechanism and is, at a section between its ends, provided with a tiltable or rockable anchorage connected to a body portion of the load carrier foot.

One preferred embodiment is further suitably characterized in that the clamping mechanism comprises a lever which is pivotal about an axis approximately parallel to the tilting axis of the clamping portion, and that the lever is, with an end portion, in cooperation with the actuator portion of the clamping portion while being, with an opposing end portion, actuable by an operating handle.

Further advantages will be attained according to the present invention if the subject matter of the present invention is also given one or more of the characterizing features as set forth in any of appended Claims 2 and 4 to 8.

BRIEF DESCRIPTION OF THE ACCOMPANYING DRAWINGS

The present invention will now be described in greater detail hereinbelow, with particular reference to the accompanying Drawings. In the accompanying Drawings:

FIG. 1 shows, partly in cross section, the load carrier foot according to the present invention in the open position; and FIG. 2 is a view corresponding to that of FIG. 1 of the load carrier foot in the closed position.

DESCRIPTION OF PREFERRED EMBODIMENT

Figure 1:
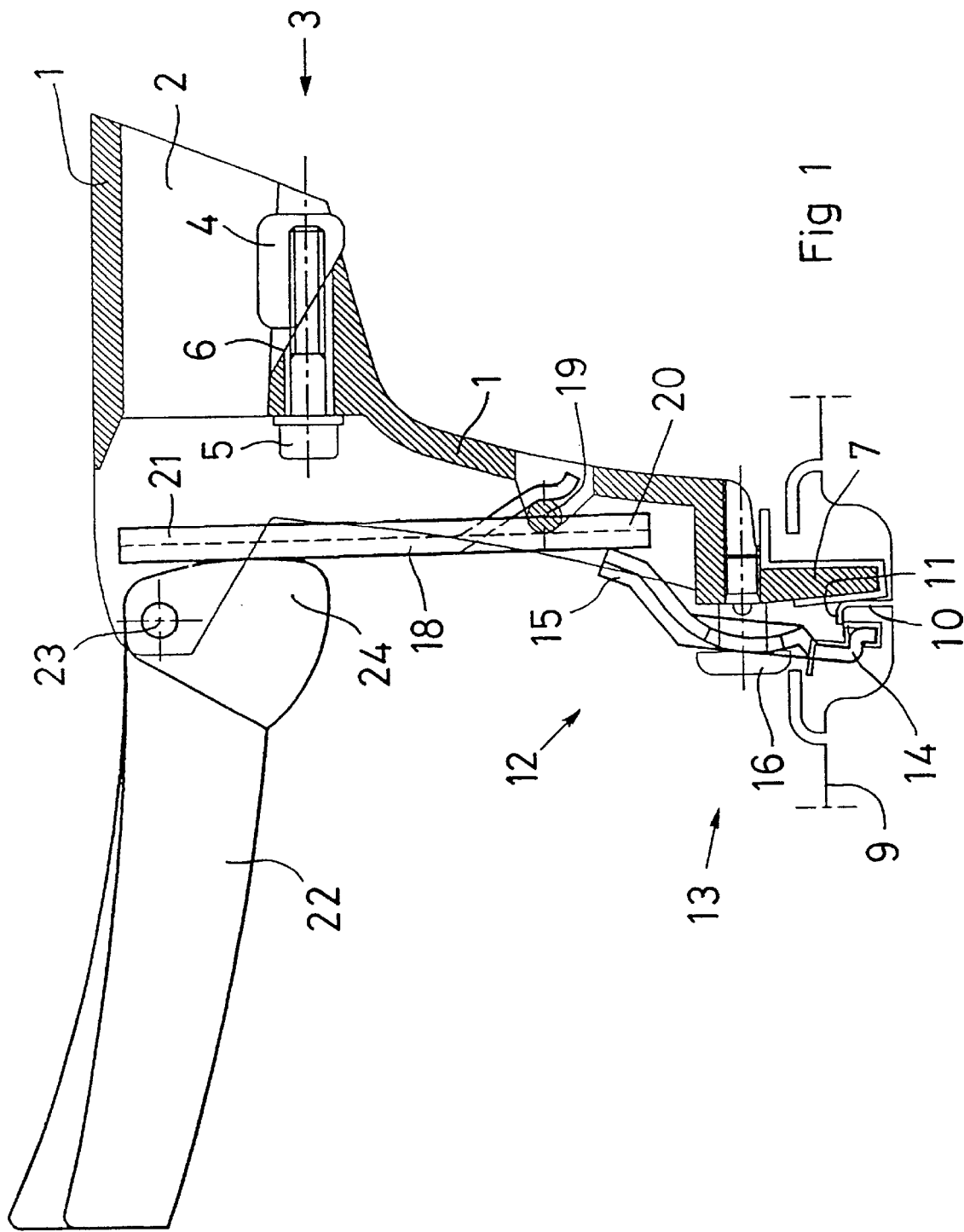

The load carrier foot according to the present invention is primarily intended for use on such vehicles as have gutters disposed along opposing roof edges in the longitudinal direction of the vehicle and provided with an upstanding anchorage bead for anchoring the load carrier foot.

However, the present invention may also be designed for use on a vehicle featuring conventional drip guttering.

The load carrier foot according to FIG. 1 has a body portion 1 which, in its upper end, defines an accommodation space 2 into which the load carrier strut (not shown) is slideable. The accommodation space 2 is in the form of a sleeve which exteriorly surrounds the end of the load carrier strut and has, in its lower defining wall, an anchorage device 3 by means of which it is fixedly clampable in the accommodation space 2. The anchorage device includes a clamping jaw 4 which, under the action of a screw 5, may be drawn upwards along an obliquely inclined ramp surface 6 so that it can thereby be clamped into the accommodation space to positionally fixing engagement with the load carrier strut.

The lower end of the body portion 1 has at least one, but preferably two support portions 7 which are disposed in line after one another in the longitudinal direction of the vehicle and which are intended to support the load carrier foot on the vehicle. In the illustrated embodiment, the support portion is intended to rest on the bottom 8 of a gutter which is provided in the roof 9 of the vehicle. The support portion 7 is intended to be applied laterally against an anchorage bead 10 upstanding from the bottom 8 and having, in its upper end, a locking portion 11 bent to the horizontal.

In order to impart good stability to the load carrier foot in the longitudinal direction of the vehicle, both of the support portions are ideally disposed in spaced apart relationship from one another, at a spacing which also permits that the bottom 8 of the gutter need not be entirely linear or planar.

For fixedly clamping the load carrier foot on the vehicle, the load carrier foot is provided with a clamping portion 12 which has a tiltable or rockable anchorage 13 in the body portion 1. In such instance, the clamping portion 12 is substantially tiltable about an approximately horizontal axis which substantially extends in the longitudinal direction of the vehicle. However, the tiltable anchorage is also such that it may permit a certain oblique inclination of the clamping portion 12 in other directions in order thereby to permit adequate abutment even in such cases when the anchorage bead 10 is not completely straight.

In such cases when the load carrier foot is provided with two mutually subsequent support portions 7, it is also provided with two clamping portions 12, one for cooperation with each support portion.

The clamping portion 12 is provided, in its lower end, with a clamping member 14 for abutment against the anchorage bead 10 in a direction towards the support portion 7. At the opposite end, the clamping portion 12 has an actuator portion 15 by means of which the clamping portion 12, under the action of a clamping mechanism, is switchable between a position in abutment against the anchorage bead 10 where it fixes the load carrier foot on the vehicle, and a free position where the load carrier foot can be mounted on and dismounted from the vehicle.

The above-mentioned tiltable or rockable anchorage 13 is disposed between the clamping member 14 and the actuator portion 15. This is realised in that the clamping portion 12 has a vertically oblong aperture through which extends a bolt 16 fitted with a head. The bolt 16 is screwed into a correspondingly threaded bore 17 in the body portion 1. The bolt 16 is locked in a fixed position in the body portion by being provided with a shoulder which is clamped against the side of the body portion 1 facing towards the clamping portion 12 on tightening of the bolt.

The shaft of the bolt is dimensioned so as to be able to extend with relatively good clearance through the oblong aperture of the clamping portion 12, while the head of the bolt is dimensioned so as to abut against the side of the clamping portion facing away from the support portion and thereby prevent the clamping portion 12 from being removed from the support portion 7. Furthermore, the clamping portion has an arched abutment surface against the inside of the head in order, also in the at least partially tightened state of the clamping portion, to ensure that this can rock or move in the intended manner.

The bolt 16 may possibly be designed in such a manner that its effective length is variable, whereby the clamping position and clamping force of the clamping portion 12 can be adjusted.

The clamping member 14 on the clamping portion 12 is of a design which corresponds or is complementary to the design of the anchorage bead 10 and is therefore provided with a horizontally directed catch portion which, on abutment, is intended to enter in beneath the locking portion 11 of the anchorage bead 10 so that lifting straight upwards of the load carrier foot is prevented. At the same time, there is created, on application in place of the clamping member 14, a laterally directed clamping force against the anchorage bead 10 which in its turn abuts against and is supported by the support portion 7. Thus, application of the clamping member 14 entails, on the one hand, a purely frictional engagement with the anchorage bead 10 and, on the other hand, a geometrically bonded engagement therewith.

The clamping mechanism which is employed for operating the clamping portion 12 between its applied and disengaged position includes a lever 18 which has a pivotal anchorage in the body portion 1 via a journal pin 19 journalled therein. The pivot axis of the lever 18 may suitably be approximately parallel with the major tilting or rocking direction of the clamping portion 12.

The lower end of the lever 18 has an end portion 20 which cooperates with the actuator portion 15 of the clamping portion 12 for operating the clamping portion. At the opposite end, the lever 18 is provided with an upper end portion 21 which is intended for cooperation with an operating handle 22. To ensure abutment between the upper portion 21 of the lever 18 and the operating handle 22, a spring is suitably provided which, with one end, is supported against the body portion 1 and, with its other end, forces the lever into abutment against the operating handle 22.

The operating handle is secured in the body portion 1 via a pivot 23 in which the pivot axis is substantially parallel with the axis of rotation 19 of the lever 18 and the tilting axis of the clamping portion 12. The operating handle is provided with a cam section 24 which is designed and shaped in such a manner that, when the operating handle 22 is pivoted from the open position illustrated in FIG. 1 in a counterclockwise direction, the upper portion of the lever 18 is pressed inwardly towards the center of the vehicle, at the same time as the lever is pivoted such that its lower end portion 20 moves outwardly for actuation of the actuator portion 15. As a result of this actuation, the clamping portion 12 will rock about its anchorage 13 so that its clamping member 14 moves in a direction to the right in FIG. 1 and is urged into abutment against the anchorage bead 10. The cam section 24 is further of such configuration that the movement of the lever in an inward direction will be at its maximum just before the operating handle has been completely pivoted to its end position in a counterclockwise direction, whereafter the lever is once again permitted to swing outwards to some extent during the final pivoting phase of the handle. Hereby, the handle is self-locking, for which reason the risk that the load carrier foot be shaken loose is eliminated.

The operating handle is suitably designed as a pivotal protective hood which is of such size that, in the closed position (according to FIG. 2), it prevents access to the anchorage device 3 and, in addition, on its outside covers the moving components of the load carrier foot. The operating handle is provided with a lock by means of which its is fixedly lockable in the body portion 1.

In order to ensure that the clamping force of the clamping portion 12 against the vehicle, and preferably its anchorage bead 10, is kept within a predetermined range, it is appropriate to incorporate into the load carrier foot an elastic element with this function, for example by producing the lever 18 from a resiliently yieldable material and designing it as a spring element which, in the fixedly clamped position of the load carrier foot, may be somewhat flexed.

As was mentioned above, the support portions 7 are suitably two in number, for which reason one clamping portion 12 is provided for each support portion. The distance between the outer edges of the support portions, seen in the longitudinal direction of the vehicle, may suitably be of approximately the same order of magnitude as the height of the load carrier foot. In such an embodiment, the lever 18 is designed to be approximately triangular, seen in the longitudinal direction of the load carrier strut (not shown on the Drawings). Further, the journal pin 19 is placed centrally in the lever 18, counting in the longitudinal direction of the vehicle, and is moreover relatively short, so that the lever can, to some extent, rock or tilt about a vertical axis and may possibly be considered as in "floating suspension" in a three-point suspension. As a result of such an arrangement, the load carrier foot may readily adapt to such situations where the anchorage beads 10 on opposing sides of the vehicle are not exactly parallel with one another, or to such situations where they are somewhat arched or possibly of varying thickness along their length, or have other deformations.

DESCRIPTION OF ALTERNATIVE EMBODIMENTS

In the foregoing, the load carrier foot has been described as designed for employment on a vehicle with longitudinal gutters at opposing sides of the vehicle roof. However, the load carrier foot may also be designed for use on such vehicles as are provided with drip guttering or beads along the opposing edges of the vehicle roof. In such an embodiment, the clamping portion 12 is designed to be longer and more curved so that it may extend about the drip guttering or bead on whose bottom the support portion 7 rests. The clamping portion 12 is, in such instance, designed so as to grasp about the drip bead obliquely from the side, and possibly from beneath.

The present invention may be further modified without departing from the spirit and scope of the appended claims.

What is claimed is:

1. A load carrier foot for fastening onto a vehicle, comprising:
    a structural member having a support portion at a lower end thereof for supporting a load carrier on the vehicle;
    a clamping member having a first end portion and a second end portion and being pivotally fastened to said structural member, about a first pivot axis, for urging against one of the vehicle or a fastening bead provided thereon;
    a lever provided pivotally about a second pivot axis approximately parallel to said first pivot axis, said lever having a first end portion and a second end portion, said first end portion being arranged for cooperating with said second end portion of said clamping member; and
    an operating member for pivoting said lever by cooperating with said second end portion thereof.

2. The load carrier foot of claim 1, wherein the distance between said second pivot axis and said second end portion of the lever is greater than the distance between said second pivot axis and said first end portion of the lever.

3. The load carrier foot of claim 1, wherein said lever is made of a resiliently yieldable material so as to constitute a spring element.

4. The load carrier foot as claimed in claim 1, wherein said clamping member is movable towards and away from said support portion for fixedly clamping a bead on the vehicle between itself and said support portion.

5. The load carrier foot as claimed in claim 1, wherein said lever which is pivotal about a shaft approximately parallel with the first pivot axis of said clamping member, the first end portion of said lever being in cooperation with an actuator portion at the second end portion of said clamping member, the second end portion of said lever being actuable by said operating member.

6. The load carrier foot as claimed in claim 1, wherein said clamping member further comprises a spring element for regulating the clamping force of said clamping member.

7. The load carrier foot as claimed in claim 1, wherein said lever is produced from a resiliently yieldable material and is dimensioned so as to constitute a spring element.

8. The load carrier foot as claimed in claim 1, wherein said operating member is pivotally secured in a body portion of said load carrier foot, a pivot axis of said operating member being approximately parallel with the pivotal axis of said clamping portion; said operating member having a cam section for engagement with said lever.

9. The load carrier foot as claimed in claim 1, wherein said cam section is configured so as, on movement of said operating member in a clamping direction, first to pivot the lever in the clamping direction thereof and then, immediately prior to the end of the path of movement of the operating member, to allow the lever to pivot back slightly.

10. The load carrier foot as claimed in claim 1, comprising two support portions disposed in a line along a longitudinal direction of the vehicle, said clamping member being common to both said support portions.

11. An arrangement for fastening a load carrier to a vehicle roof having an elongated fastening means extending in the longitudinal direction of the vehicle, comprising:
    two clamping means relatively movable towards and away from one another for clamping said fastening means therebetween;
    a pivotable operating member for operating said clamping means;
    a lever pivotable about a pivot axis, said lever having a longer arm and an end portion thereof distal from said pivot axis cooperating with said operating member for pivoting the lever, and a shorter arm and an end portion thereof distal from said pivot axis being provided for moving said clamping means.

12. The arrangement of claim 11, wherein said operating member has pressure means for contacting said end portion of the longer arm.

13. A load carrier for fastening to a vehicle roof, having an elongated fastening member extending in a longitudinal direction of the vehicle roof comprising:
    a load carrier bar extendable transversely over the vehicle roof;
    a structural member having at least one support member at a lower end portion thereof, said load carrier bar being connectible to an upper end portion of said structural member;
    a clamping member pivotally fastened to said structural member about a first pivot axis, said clamping member having a clamping portion for clamping against said elongated fastening member;
    an operating member pivotally fastened to said structural member about a second pivot axis;
    lever means operationally connecting said operating member to said clamping member, said lever means being pivotally fastened to said structural member about a third pivot axis; and
    said first, second and third pivot axes all being approximately parallel to one another.

14. The load carrier as claimed in claim 13, wherein said first, second and third pivot axes extend approximately horizontally in a longitudinal direction of the vehicle when the load carrier is in its position for use on the vehicle.

15. The load carrier as claimed in claim 13, wherein said lever means has a longer arm with a first end portion distal from said third pivot axis, and a shorter arm with a second end portion distal from said third pivot axis, said first end portion cooperating with said operating member and said second end portion cooperating with said clamping member.

16. A load carrier foot for fastening, onto a vehicle, a load carrier bar extending transversely over a roof of the vehicle, comprising;
    a structural member to which the load carrier bar is connectible said structural member having a support member for supporting the load carrier foot on the vehicle;
    a clamping member for clamping said load carrier foot onto the vehicle;
    an operating member pivotally fastened to the structural member;

a lever made from a resiliently yieldable material thereby to constitute a spring element, said lever being pivotally fastened to the structural member and having a longer arm and a shorter arm said longer arm being provided for cooperating with the operating member to be operated thereby and said clamping member being operated by the shorter arm.

17. A load carrier foot for fastening a load carrier onto a vehicle, said load carrier foot comprising:

a structural member having a support member adapted to support said load carrier foot on the vehicle;

a clamping member having a first end portion and a second end portion and said clamping member being pivotally fastened to said structural member about a first pivot axis, said first end portion of said clamping member being adapted to be urged against a fastening bead of a vehicle;

a lever provided pivotally about a second pivot axis approximately parallel to said first pivot axis, said lever having a clamping member engaging portion and an operating member engaging portion, said clamping member engaging portion of said lever being arranged for cooperation with said second end portion of said clamping member; and an operating member for pivoting said lever by cooperating with said operating member engaging portion thereof.

\* \* \* \* \*